US008813860B2

(12) United States Patent
Bleil et al.

(10) Patent No.: US 8,813,860 B2
(45) Date of Patent: Aug. 26, 2014

(54) FUEL CELL SYSTEM FOR EXTINGUISHING FIRES

(75) Inventors: Julika Bleil, Hamburg (DE); Lars Frahm, Hamburg (DE); Andreas Westenberger, Buxtehude (DE); Claus Hoffjann, Hamburg (DE)

(73) Assignee: Airbus Operations GmbH (DE)

( * ) Notice: Subject to any disclaimer, the term of this patent is extended or adjusted under 35 U.S.C. 154(b) by 1283 days.

(21) Appl. No.: 12/084,901

(22) PCT Filed: Nov. 9, 2006

(86) PCT No.: PCT/EP2006/010764
§ 371 (c)(1),
(2), (4) Date: Aug. 18, 2009

(87) PCT Pub. No.: WO2007/054316
PCT Pub. Date: May 18, 2007

(65) Prior Publication Data
US 2009/0321090 A1    Dec. 31, 2009

Related U.S. Application Data

(60) Provisional application No. 60/738,079, filed on Nov. 18, 2005.

(30) Foreign Application Priority Data

Nov. 10, 2005  (DE) .......................... 10 2005 053 694

(51) Int. Cl.
    A62C 2/00    (2006.01)
(52) U.S. Cl.
    USPC .............. 169/45; 169/11; 244/129.2

(58) Field of Classification Search
    USPC ............ 429/512, 112, 61, 56, 62; 169/45, 46, 169/56; 454/233
    See application file for complete search history.

(56) References Cited

U.S. PATENT DOCUMENTS

| 5,957,210 | A | 9/1999 | Cohrt et al. |
| 6,401,487 | B1 | 6/2002 | Kotliar |
| 6,560,991 | B1 * | 5/2003 | Kotliar ........................... 62/640 |
| 6,915,655 | B2 * | 7/2005 | Lee et al. ......................... 62/271 |
| 7,043,934 | B2 * | 5/2006 | Radermacher et al. ......... 62/285 |
| 7,165,625 | B2 * | 1/2007 | Long .............................. 169/46 |
| 2002/0040940 | A1 | 4/2002 | Wagner et al. |

(Continued)

FOREIGN PATENT DOCUMENTS

| AU | 2004308691 | 7/2005 |
| CA | 2473723 A1 | 8/2003 |

(Continued)

OTHER PUBLICATIONS

Commonly owned co-pending U.S. Appl. No. 12/084,747, filed Aug. 24, 2009. Also published as US 2010-0018723.

Primary Examiner — Len Tran
Assistant Examiner — Viet Le
(74) Attorney, Agent, or Firm — Lerner, David, Littenberg, Krumholz & Mentlik, LLP

(57) ABSTRACT

A fire fighting system for extinguishing a fire, which has a fuel cell for producing a nitrogen-enriched cathode exhaust air. The fuel cell is supplied with air and a fuel. Within the fuel cell, the air is then reduced to a determined oxygen content. The exhaust air is supplied to the fire source.

19 Claims, 6 Drawing Sheets

(56) References Cited

U.S. PATENT DOCUMENTS

| | | |
|---|---|---|
| 2002/0139542 A1 | 10/2002 | Lessi et al. |
| 2003/0136879 A1* | 7/2003 | Grabow et al. ............ 244/129.2 |
| 2005/0173929 A1* | 8/2005 | Wobben ........................ 290/55 |
| 2005/0257937 A1 | 11/2005 | Fabre |
| 2008/0168798 A1 | 7/2008 | Kotliar |
| 2009/0126949 A1 | 5/2009 | Wagner |
| 2010/0018723 A1 | 1/2010 | Bleil et al. |

FOREIGN PATENT DOCUMENTS

| | | |
|---|---|---|
| CA | 2551232 | 7/2005 |
| CZ | 297177 | 2/1999 |
| DE | 10343342 | 2/2005 |
| EP | 1140625 A1 | 10/2001 |
| EP | 1550482 | 7/2005 |
| EP | 2210645 A1 | 7/2010 |
| JP | 9276428 | 10/1997 |
| JP | 2003144568 A | 5/2003 |
| JP | 2003272683 A | 9/2003 |
| JP | 2003290380 A | 10/2003 |
| JP | 2003530922 A | 10/2003 |
| JP | 2004022487 A | 1/2004 |
| JP | 2004266962 A | 9/2004 |
| JP | 2004350758 A | 12/2004 |
| JP | 2005515045 T | 5/2005 |
| JP | 2005522239 T | 7/2005 |
| JP | 2005285782 A | 10/2005 |
| JP | 2007516759 A | 6/2007 |
| JP | 5217593 B2 | 6/2013 |
| RU | 93014902 A1 | 11/1996 |
| RU | 2262600 A | 4/2005 |
| RU | 2253492 C1 | 6/2005 |
| RU | 2372956 C2 | 11/2009 |
| SU | 1651930 A1 | 5/1991 |
| SU | 1839095 A1 | 12/1993 |
| WO | 9703631 | 2/1997 |
| WO | 03061769 A1 | 7/2003 |
| WO | 03066169 A1 | 8/2003 |
| WO | 2005007273 | 1/2005 |

* cited by examiner

FUEL CELL SYSTEM FOR EXTINGUISHING FIRES

REFERENCE TO RELATED APPLICATIONS

This application claims the benefit of the filing date of German Patent Application No. 10 2005 053 694.8 filed Nov. 10, 2005 and of U.S. Provisional Patent Application No. 60/738,079 filed Nov. 18, 2005, the disclosure of which applications is hereby incorporated herein by reference.

FIELD OF THE INVENTION

The present invention relates to fire fighting. In particular, the present invention relates to a fire fighting system for extinguishing a fire, the use of such a fire fighting system in an aircraft, the use of such a fire fighting system in a building, the use of such a fire fighting system on a ship, an aircraft having such a fire fighting system, and a method for fire fighting.

TECHNICAL BACKGROUND OF THE INVENTION

For about 40 years, halogenated hydrocarbons (Halon) have been used for extinguishing fires on board aircraft. Halon is partly or completely halogenated hydrocarbons, which engage chemically in the chain reaction of the fire and thus lead to an interruption of the reaction.

Admittedly, the Halon 1211 (chlorine-bromine-difluoro-methane for hand-held fire extinguishes) and 1301 (bromine-trifluoro-methane for installed extinguishing assemblies) contribute to the formation of the stratospheric ozone and therefore are included with the materials which were forbidden in the Montreal Protocol of the United Nations.

SUMMARY OF THE INVENTION

It may be desirable to provide an improved fire fighting system in an aircraft.

According to an exemplary embodiment of the present invention, a fire fighting system for extinguishing a fire in a room is provided, the fire fighting system including a fuel cell for producing a nitrogen-enriched cathode exhaust air and a conduit assembly for conducting the nitrogen-enriched cathode exhaust air to the fire source, so that an oxygen content around the source of the fire is reduced, such that the source of the fire is extinguished.

Thus, an effective system for fighting fires in rooms or objects may be provided, which uses oxygen-poor and nitrogen-rich exhaust air of a fuel cell system. In this manner, the exhaust air of a board-internal fuel cell system for fighting a fire or for avoiding fire danger may be used. In addition, extinguisher devices may be dimensioned smaller or even completely eliminated. For this purpose, all types of fuel cells may be used, such as, for example, Alkaline Fuel Cells (AFC), Proton Exchange Membrane Fuel Cells (PEMFC), Phosphoric Acid Fuel Cells (PAFC), Molten Carbonate Fuel Cells (MCFC), Solid Oxide Fuel Cells (SOFC), or Direct Alcohol/Methanol Fuel Cells (DAFC/DMFC).

In this regard, the operating temperature of the electrolyte may not be important, rather solely the composition of the cathode exhaust air. This may contain an inert gas, such as nitrogen or the like. The exhaust air therefore may either be dry or contain water, depending on the fuel cell type and if necessary, the system settings.

Based on the inert properties of the nitrogen, nitrogen may particularly well suited for fire fighting of rooms.

According to a further embodiment of the invention, the fire fighting system further has a regulating or control unit for triggering (employing) the supply of the nitrogen-enriched cathode exhaust air to the source of the fire.

Adjustment of the oxygen content may be performed by changing the lambda value of the cathode of the fuel cell. The lambda value represents the ratio between the oxygen amount supplied to the fuel cell and the oxygen amount converted inside the fuel cell. The ratio may be adjusted by regulating the air supply (blower) of the fuel cell. In case the oxygen content in the cathode exhaust gas is too high, the air supply and therefore the lambda value has to be decreased. Thus, the oxygen content inside the room may be controlled by supplying adequate cathode exhaust air to the room.

Thus, an extinguishing process may be started automatically. In addition, the oxygen content may be adjusted or readjusted accordingly depending on the specifications. The control/regulation may take place completely automatically. For example, the oxygen content may be adjusted, when the room is to be entered by people, so that it lies approximately at 15% vol. In this manner, it may be ensured that the room can be entered by people, and on the other hand, however, the ignition danger or fire danger relative to normal air is substantially reduced. The fire fighting system, then, also can be used defensively or preventatively.

On the other hand, for example, by means of the regulating or control unit, it may be ensured also that the oxygen portion always remains under a determined, preset maximum value, for example, below 12% vol. or below a still smaller value.

Naturally, the regulating or control unit also may be designed as a pure control unit. The regulation then may be performed manually.

According to a further embodiment of the present invention, the regulating or control unit is designed for controlling or regulating an air supply of the cathode of the fuel cell, a fuel supply of the anode of the fuel cell and/or the supply of the nitrogen-enriched cathode exhaust air to the fire source.

Thus, the power of the fuel cell may be adjusted depending on the requirements, in that more or less fuel, more or less air is supplied or more or less power is required by the consumers. In addition, conducting of the nitrogen-enriched cathode exhaust air into the room may be controlled or regulated, in that, for example a corresponding valve is operated by the regulating or control unit.

According to a further embodiment of the present invention, the fire fighting system further includes a measurement unit for measuring at least one physical parameter, selected from the group consisting of the oxygen content within the room, the hydrogen content within the room, a temperature within the room, a pressure within the room, a moisture content within the room, and a detector for recognizing a fire characteristic within the room. In addition, the fire fighting system includes a data line for transmitting the measured physical parameters from the measurement unit to the regulating or control unit.

Thus, the condition in the room may be monitored. If the temperature in the room increases, for example, or if smoke develops there, the oxygen content may be reduced further through the supply of the cathode exhaust air, in order to extinguish a developing fire. Likewise, the pressure may be monitored. If the pressure exceeds a determined value, for example, fortified, nitrogen-enriched cathode exhaust can be supplied, in which fire parameters are related to the intensity of the smoke development. The automatic and permanent maintenance of the predetermined parameter may be a primary object of the regulating and control unit of the fire fighting system according this.

According to a further embodiment of the present invention, the fire fighting system further includes a measurement unit for measuring at least one physical parameter, selected from the group consisting of the oxygen content of the exhaust air in a conduit system, the hydrogen content of the exhaust air in a conduit system, the carbon dioxide content of the exhaust air in a conduit system, the carbon monoxide content of the exhaust air in a conduit system, the nitrogen oxide content of the exhaust air, the volume flow of the exhaust air in a conduit system, a temperature of the exhaust air in a conduit system, a pressure of the exhaust air in a conduit system, a moisture content of the exhaust air in a conduit system. In addition, the fire fighting system includes a data line for transmitting the measured physical parameters from the measurement unit to the regulating and control unit.

According to a further embodiment of the present invention, the fire fighting system further includes a valve for releasing the exhaust of a conduit system to the surrounding air. If, for example, the oxygen content of the exhaust air of the conduit system exceeds or falls below a determined value, this may be detected by the measurement unit, transmitted to the regulating and control unit, and if necessary, the vale is actuated, such that the exhaust air is not supplied to a room, rather to the surrounding air.

According to a further embodiment of the present invention, the fire fighting system includes further a pressure relief valve for regulating pressurization in the room.

If, for example, the pressure in the room exceeds a determined threshold value or if the difference between the inner pressure in the room and the surrounding environment of the room exceeds a determined parameter, air may be released accordingly.

According to a further exemplary embodiment of the present invention, the fire fighting system further includes a compressor for compressing the nitrogen-enriched cathode exhaust air, so that the fire extinguishing performance is increased and/or a heat exchanger for cooling the nitrogen-enriched cathode exhaust air.

In this manner, the nitrogen-enriched cathode air may be compressed or cooled, before it is supplied to the room or fire source.

According to a further exemplary embodiment of the present invention, the fire fighting system further includes a condenser for condensing of water from the nitrogen-enriched cathode exhaust air and a water tank for storing the condensed-out water.

In this manner, the cathode exhaust water may be produced, which is then stored. From this storage, it then may be supplied to the water supply of the aircraft, for example, or it may be used in the event of a fire for extinguishing purposes.

A direct line also may be provided from the condenser to the water system of the aircraft (without having to store the condensed-out water in a water tank).

In addition, also a supply from the condenser to a hydrogen reformer system may be provided, since the hydrogen reformer may be necessary for producing hydrogen from hydrocarbon water.

According to a further exemplary embodiment of the present invention, the fire fighting system includes a climate control assembly for tempering the room. Thus, the air can be drawn, cooled, and again supplied to the room, without affecting the oxygen content in the room. In addition, the climate control assembly may be used for tempering the fuel cell exhaust before supply to the room. Therefore, for example, after the condensation, the temperature before supplying into the room is regulated again to a determined level.

According to a further exemplary embodiment of the present invention, the fire fighting system further includes a supply line for providing an air supply of the cathode of the fuel cell from the room, whereby the oxygen content in the room may be lowered further.

This supply, for example, may be switched on via the control and regulating device, when the oxygen portion in the room is to be lowered further, in order to further increase the fire protection. In other cases (or simultaneously), the fuel cell may be supplied with external air or also cabin air.

According to a further exemplary embodiment of the present invention, the regulating or control unit is designed for controlling or regulating at least one of the heat exchanger, a compressor, the pressure relief valve, the bleed valves, the climate control assembly, and the supply of the water to the hydrogen reformer.

Depending on the specifications, therefore, the temperature of the nitrogen-enriched cathode exhaust gas conducted into the room may be cooled accordingly. In addition, the degree of compression of the anode supply air, the cathode supply air, or the nitrogen-enriched cathode exhaust supplied into the room may be adjusted.

According to a further exemplary embodiment of the present invention, the cathode exhaust may be interconnected to further fuel cells, so that the discharged air from one cathode serves as the supply for others. This leads to further lowering of the oxygen content in the discharged air of the interconnected fuel cells.

According to a further exemplary embodiment of the present invention of the fire fighting system, the cathode exhaust air also may be interconnected to a device for additional reduction of the oxygen. For this purpose, for example, an air fractionation membrane may be suitable. It may separate the cathode exhaust into two streams: oxygen rich air and nitrogen rich air. The oxygen rich air is emitted to the atmosphere; the remaining nitrogen-rich air is supplied to the room.

According to a further exemplary embodiment of the present invention, the required electrical and thermal energy in the fire fighting system is provided directly from the fuel cell.

Thus, no external energy supply may be required. The system may work in a self-sustaining manner and may produce its energy itself.

According to a further exemplary embodiment of the present invention, a fire fighting system is provided, which further includes a supply line and a water storage, whereby water may be supplied from the water storage to the fire source via the supply line.

According to a further exemplary embodiment of the present invention, the fire fighting system further includes an intermediate storage for storing the nitrogen-enriched cathode exhaust air, which can be emptied in the event of a fire for fast extinguishing.

Furthermore, according to a further exemplary embodiment of the present invention, the room in which the fire is to be extinguished, is a room in an aircraft.

According to a further exemplary embodiment of the present invention, the use of a fire fighting system, as described above, is provided for extinguishing a fire source in an aircraft. For example a fire source in the cargo bay, electronic bay or small hidden areas.

According to a further exemplary embodiment of the present invention, the use of such a fire fighting system for extinguishing a fire source in a ship is provided.

According to a further exemplary embodiment of the present invention, the use of such a fire fighting system for extinguishing a source of fire in buildings is provided.

According to a further exemplary embodiment of the present invention, the use of such a fire protection system is provided for general oxygen reduction and therewith, for simulation of altitude and for oxidation reduction in a room.

In addition, an aircraft is provided, including a fire fighting system, as described above, for fire fighting of a room in an aircraft.

Furthermore, according to a further exemplary embodiment of the present invention, a method for fire fighting is provided, in which a nitrogen-enriched cathode exhaust air is produced by a fuel cell and the nitrogen-enriched cathode exhaust air is conducted to a fire source, so that the oxygen content around the fire source is reduced, such that the fire source is extinguished.

In this regard, a method may be provided, through which an improved fire fighting in a room of an aircraft may be made available. Further fire extinguishing systems, such Halon systems, may not be necessary.

According to a further exemplary embodiment of the present invention, physical parameters within the room are measured, such as the temperature within the room, the pressure within the room, the oxygen content within the room, the moisture content within the room, the hydrogen content within the room, or the development of smoke within the room. These measured parameters then may be transmitted from the measurement unit to the regulating or control unit for triggering the supply of the nitrogen-enriched cathode exhaust air to the fire source. The oxygen content of the cathode exhaust may be adjusted by the control of the Lambda of the cathode by the controlling unit. In addition an air separation unit may further decrease the oxygen content of the cathode exhaust before supplying it to a fire source.

According to a further exemplary embodiment of the present invention, physical parameters in a conduit system are measured, such as for example the oxygen content of the exhaust air, the hydrogen content of the exhaust air, the carbon dioxide content of the exhaust air, the carbon monoxide content of the exhaust air, the nitrogen oxide content of the exhaust air, the volume flow of the exhaust air, the temperature of the exhaust air, the pressure of the exhaust air, and the moisture content of the exhaust air. In addition, the fire fighting system includes a data line for transmitting the measured physical parameters from the measurement unit to the regulating and control unit.

In this manner, it may be ensured that the oxygen content in the room is adjusted respectively, as is necessary according to the present conditions in the room.

Further exemplary embodiments, of the invention are provided in the dependent claims.

Next, preferred exemplary embodiments of the present invention will be described with reference to the figures.

SHORT DESCRIPTION OF THE DRAWINGS

DETAILED DESCRIPTION OF EXEMPLARY EMBODIMENTS

Figure 1:
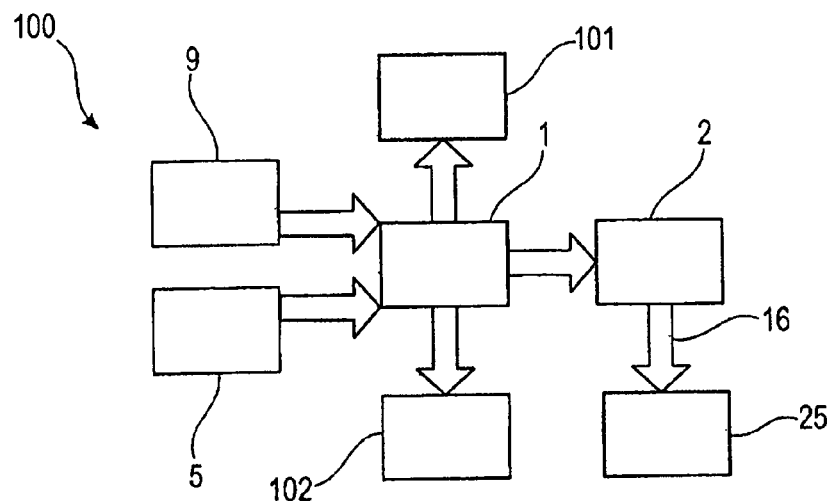
FIG. 1 shows a schematic flow diagram of a fire fighting system according to an exemplary embodiment of the present invention.

The illustrations in the figures are schematic and not to scale.

In the following description of the figures, the same reference numerals are used for the same or similar elements.

FIG. 1 shows a schematic flow diagram of a fire fighting system for extinguishing a fire source in a room, for example, in an aircraft, according to an exemplary embodiment of the present invention. As can be seen in FIG. 1, the fire fighting system 100 has a fuel cell or fuel cell assembly 1, which is provided on the inlet side with corresponding raw materials 5, 9 and releases electrical energy 101, thermal energy 102 and air with a reduced oxygen portion 2.

Water vapor may be added to the air and the fuel cell, depending on the design of the fuel cell 1. The oxygen-reduced air 1 is then supplied for fire protection purposes via a corresponding line 16 to the room to be protected.

Figure 2:
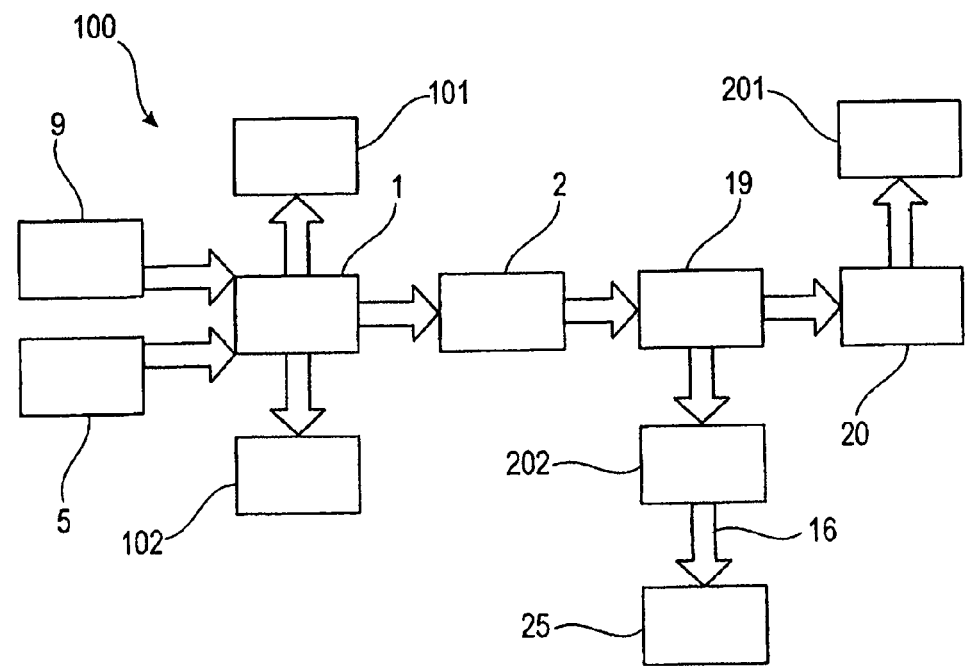
FIG. 2 shows a schematic flow diagram of a fire fighting system according to a further exemplary embodiment of the present invention.

FIG. 2 shows a schematic flow diagram of a fire fighting system 100 according to a further embodiment of the present invention. In the system shown in FIG. 2, the exhaust air 2 is separated by a condenser 19 into water 20 and dry, nitrogen-rich (oxygen-poor) air 202. Here, only the dry nitrogen-rich air 202 serves as an inert protective gas, which is supplied via the line 16 to the fire to be extinguished.

All rooms and objects may be "made inert" by the exhaust air of the fuel cell or all fires in rooms and objects may be extinguished with the cathode exhaust air.

With reducing the oxygen content to below approximately 15 vol %, these rooms and objects may not serve as permanent residences of people and animals. With approximately 17 vol %, the possibility of fire may greatly be reduced, longer inhabitance by people, however, may still be possible. The reduced oxygen portion may reduce be the danger of fire or explosion.

The use of the fuel cell exhaust gas may be environmentally friendly and not toxic.

With the use of a fuel cell system for obtaining current, heat, and/or water, the oxygen-poor air may be eliminated as a by-product.

The fire fighting system 100 may be used in mobile vehicles or extinguishing devices or in aircraft as well as in stationary applications, for example, within buildings.

Figure 3:
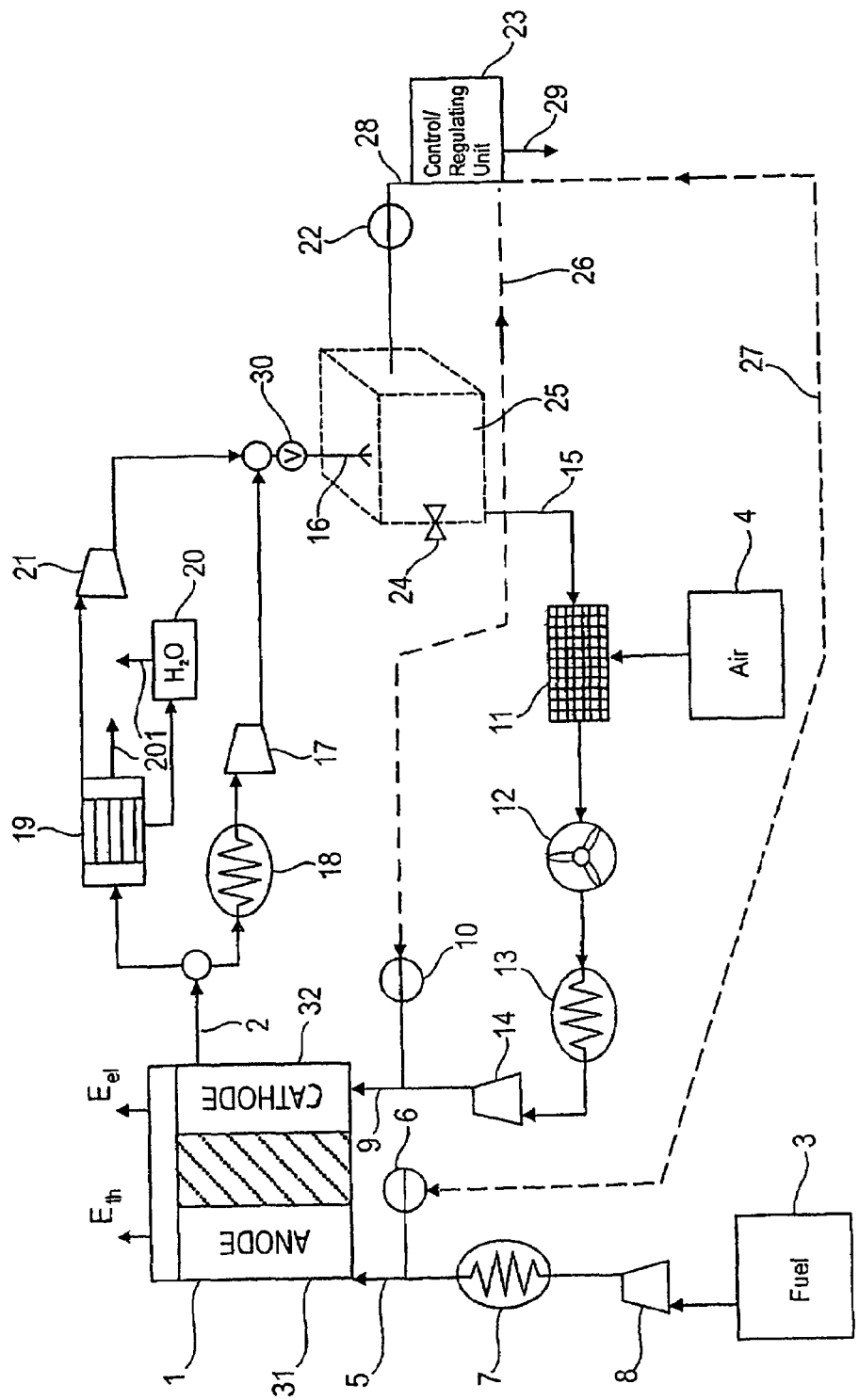
FIG. 3 shows a schematic principle diagram of a fire fighting system according to an exemplary embodiment of the present invention.
Figure 4:
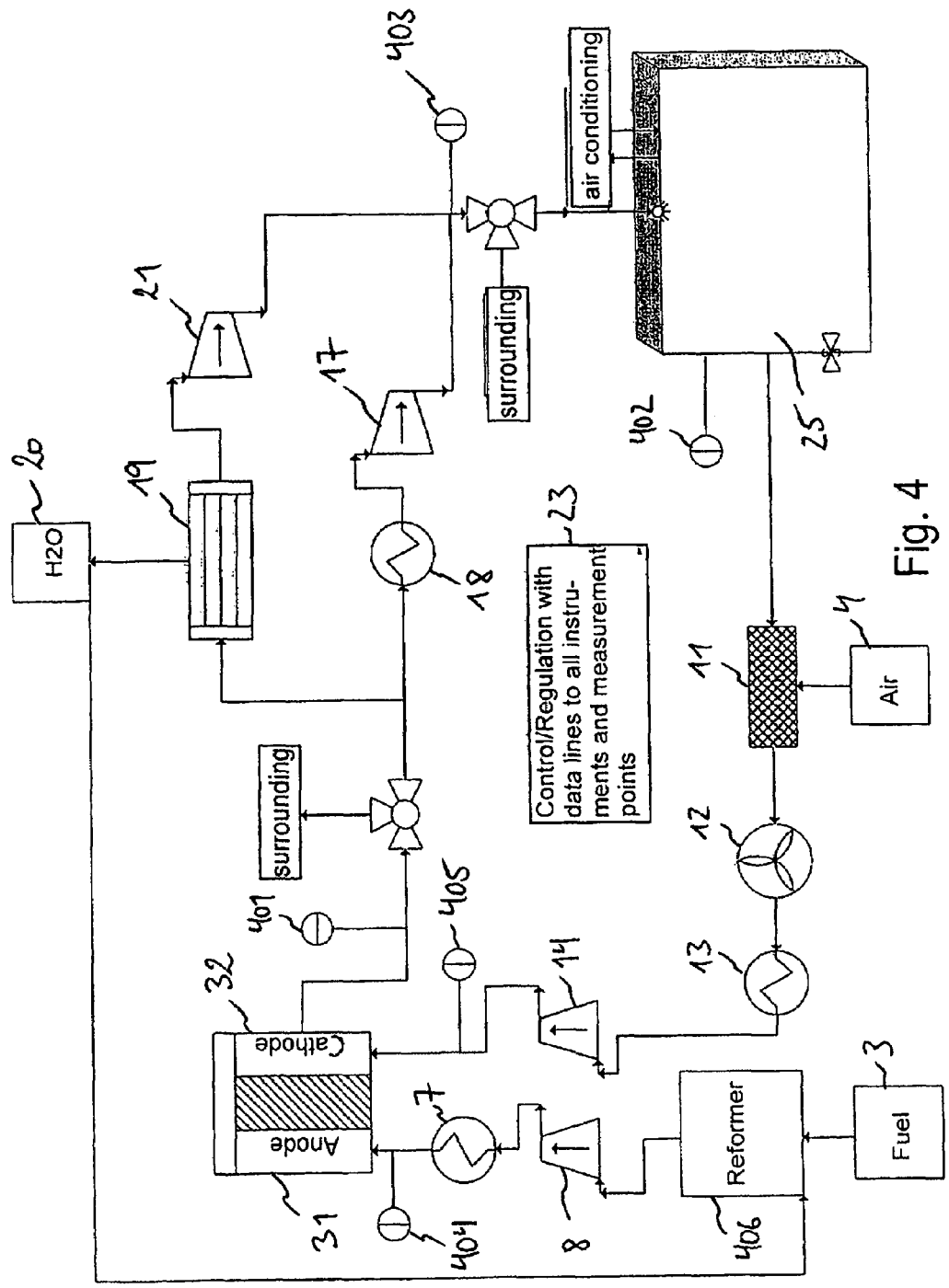
FIG. 4 shows a schematic principle diagram of a fire fighting system according to a further exemplary embodiment of the present invention.
Figure 5:
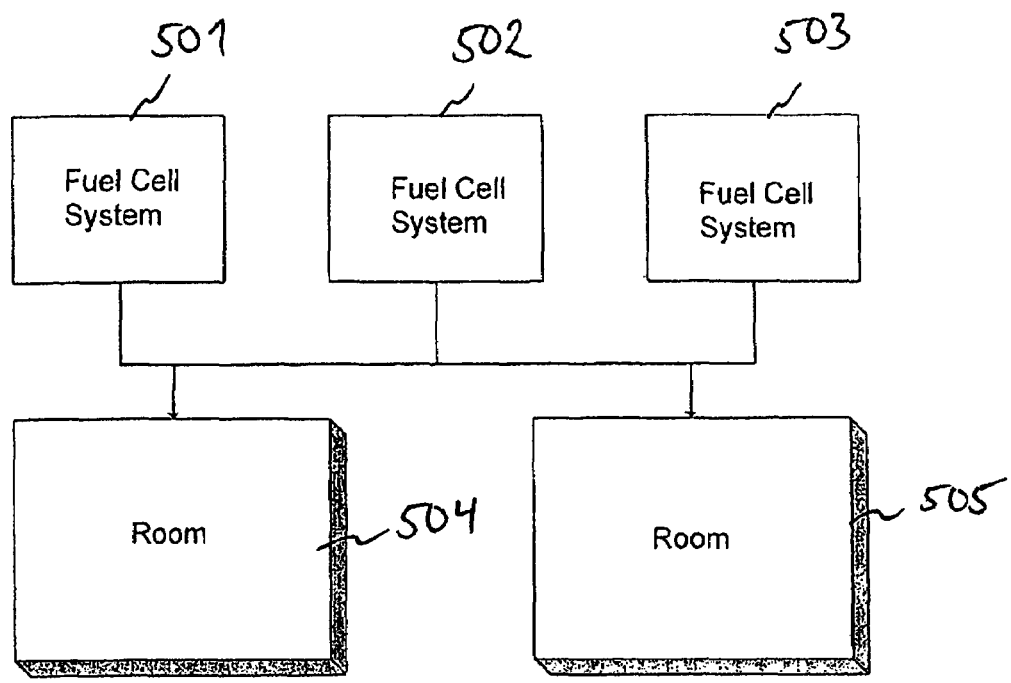
FIG. 5 shows a schematic principle diagram of a fire fighting system according to an exemplary embodiment of the present invention.

FIG. 3 and FIG. 4 show, schematically, principle diagrams of a fire fighting system 100 according to further exemplary embodiments of the present invention. With the fuel cell 1, all types of fuel cells may be used. In addition, multiple fuel cells

1 may be provided, which, for example, are connected together as a fuel cell battery, or (redundant) are mounted at separate locations (see fuel cell systems 501, 502, 503 and rooms 504, 505 in FIG. 4). In this manner, the safety of the inventive fire fighting system 100 may be increased further.

With the fuel cells 1 to be used, for example, the so-called Alkaline Fuel Cell (AFC), Proton Exchange Membrane Fuel Cell (PEMFC), Phosphoric Acid Fuel Cell (PAFC), Molten Carbonate Fuel Cell (MCFC), Solid Oxide Fuel Cell (SOFC), or a Direct Alcohol/Methanol Fuel Cell (DAFC/DMFC) can be used. However, also other fuel cell types may be possible and desirable.

As may be seen in FIG. 3, the fuel cell 1 is supplied on the anode side with a fuel 3 and on the cathode side with air 4.

The fuel 3, which is supplied to the anode 31, may vary depending on the fuel cell type. It may not be important which type of fuel cell it is. For example, hydrogen may be used as the fuel 3, which may be available reformed or stored, for example, from hydrocarbons (as is present in aircraft fuel). With the hydrogen reformation, water is required, which may be provided through a supply line from the water storage to the reformer.

The fuel cell supply 5 is monitored and regulated by a measurement, control, and regulating unit 6. In this regard, the unit may operate as a sensor, which measures volume, temperature, pressure, or also mass, and then further processes the correspondingly measured physical parameters, in order to perform then a corresponding control or regulation based thereon.

The measured data may be transmitted via the line 27 to a central control/regulating unit 23, which then conducts the corresponding adjustments at the fuel supply 5, for example, by adjusting corresponding vales accordingly.

In order to bring the fuel 3 to the temperature and pressure level of the fuel cell 1, if necessary, a heat exchanger 7 and/or a compressor 8 is connected to the fuel cell 1.

The cathode-side air supply 9 of the fuel cell cathode 32 may be monitored and controlled/regulated similar to the fuel supply 5 by a measurement, control, and regulating unit 10. Further measurement parameters also here are volume, temperature, pressure, mass or mass flow and also the lambda value (excess air) or the purity of the supplied air.

Also here, the measured data may be transmitted via a line 26 to a central control/regulating unit 23, which then conducts the corresponding valve adjustment or the like at the air supply 9.

In addition, a filter unit 11, a blower 12, a heat exchanger 13 or a compressor 14 may be connected individually or in any combination to the fuel cell 1 and to the control and regulating unit 23.

With respect to the air supply 9, it may be important that nitrogen is contained in the air. In aircraft, external or cabin air may be used, for example.

Furthermore, the air may be conducted via a line 15 from the room 25 or the object 25 to which the nitrogen-enriched cathode exhaust air 2 is supplied again into the fuel cell 1. In this manner, the oxygen portion in the room 25 may be lowered further, whereby the fire protection or the fire fighting may be still more effective.

Also the line IS and the other air supply 4 may be controlled or regulated via the central control/regulation 23.

It is important that the exhaust gas of the cathode 2 has a minimal oxygen portion and a higher nitrogen portion than the cathode-side air supply 9. Depending on the fuel cell type, the cathode exhaust air may contain the developed product water, as far as the hydrogen/oxygen reaction occurs at the cathode side.

This exhaust air 2 has inert properties from its increased nitrogen portion, which may lead to the result that a fire first cannot exist or at least spreads much less intensely than under normal conditions.

For example, the cathode exhaust air 2 with an oxygen conversion rate (lambda) of 2 (which means that 50% of the supplied oxygen reacts in the fuel cell 1 with the hydrogen to water) still has only an oxygen portion of approximately 10.5% vol. Normal air has an oxygen portion of approximately 21% vol.

This exhaust air may be supplied directly via a conduit system 16 to the room or the object 15 and therewith, contributes to the reduction of the oxygen portion in the room or the object 25.

Via the measurement units 401, 403 (see FIG. 4), the cathode exhaust air is monitored continuously with at least one physical parameter of oxygen portion, hydrogen portion, pressure, temperature, moisture content, volume flow, carbon dioxide and carbon monoxide content. Further measuring points 402, 404, 405, are found, for example, in the conduit system 16 before supplying into the room 25 or to the anode inlet or the cathode inlet of the fuel cells. The measured data are transmitted to the central control and regulating unit 23. Depending on the situation, the release valves switch the supply into the room or the release to the environment.

Via a compressor 17 and/or a heat exchanger 18, the nitrogen-enriched cathode exhaust air 2 can be compressed and/or cooled, before it is supplied to the room/object 25.

As already mentioned, depending on the fuel cell type, the nitrogen-enriched cathode exhaust air 2 contains water, if necessary. In this case, a condenser 19 (in addition to or as an alternative to the compressor 17 and the heat exchanger 18) may be connected. The condenser 19 condenses the water out and stores it in a water tank 20 or leads directly to an external water system 201. The water system 20 may be a board-internal consumer or also, however an additional extinguishing system 32 for extinguishing fires. Also this additional extinguishing system 32 can be controlled by the control regulator 23. With the provision of a hydrogen reformer 405, the condensed-out water can be supplied to the reformer process.

The remaining, slightly moist or completely dry air, depending on the degree of condensation, as described previously, can now be supplied directly to the fire source 41 in the room 25 or via a compressor 21.

A directional valve 34 may conduct the nitrogen-rich cathode exhaust air after the condenser 19 to a storage container 36. A compressor 35, connected if necessary, compresses the nitrogen-rich cathode exhaust air and increases the storage density. In the case of a fire, the nitrogen-rich cathode exhaust air may flow out of the storage 36 and may be supplied via a pressure regulating valve 37 and terminals 38, 39 to the conduit-tube system 16.

In order to increase the extinguishing power of the nitrogen-rich cathode exhaust air, additional water may be supplied from a line 40 directly into the conduit, or tube, system 16. Also, a conduit or tube system 40 that is separate from nitrogen-rich cathode exhaust air may be provided. The water may originate therefore from the fuel cell itself, as shown by line 43, or from an external source 42, which is controlled by the control/regulator 23.

A further aspect of the invention is the combination of the use of nitrogen-rich cathode exhaust air for extinguishing or stopping fires with common extinguishers/extinguishing methods 32. In this regard, for example, the combination of water misting assemblies, CO2, nitrogen, argon, FM200, Novec or the like with the nitrogen-rich cathode exhaust air of a fuel cell is provided.

In the event of fire, then, the external extinguishing means may be supplied via the same conduit or tube distribution system 16 or a separate system 31 to the source of the fire. Also this separate system 31 may be controlled by the control/regulator 23.

Next, two exemplary embodiments will be described:

The fire source 41 is automatically recognized via a fire recognition system 22. The fire recognition system 22 activates via the control-regulating unit 23 the fire extinguishing features, such as the supply of the nitrogen-enriched cathode exhaust air. For example, in an aircraft, the fire recognition system 22 announces the occurrence of a fire to the crew via the control unit 23, so that then the pilot can activate manually the extinguishing features.

With mobile applications, such as for example, with fire engines or fuel cell hand-held extinguishers, the fire source 41 is extinguished manually and directly. An automatic recognition and/or extinguishing is therefore often not coupled directly with the fire fighting system 100.

For effective extinguishing of a fire, the air in the room 25 can be reduced to a determined oxygen content. Depending on the use, the oxygen content may be varied.

With an oxygen content of 15% vol., many materials will not burn any longer. An entry of the room generally may still be possible.

For example, the control/regulator 23 is programmed, such that the oxygen content in the room 25 is held at a constant 15% vol. However, also other programming may be possible. For example, the control/regulator 23 may be programmed, such that the oxygen content in the room 25 always lies under an adjustable threshold value. It the threshold value is approached from below, if necessary further fuel cells can be connected or the power of the fuel cell and therefore the volume flow may be increased.

The room 25 has a measurement device 22 for this purpose, which is connected to the control/regulator 23 (via a line 28). The measurement device 22 serves for constantly measuring and monitoring the oxygen content and if necessary, further parameters, such as for example, pressure, temperature, the development of smoke, hydrogen content within the room 25.

In addition, a pressure relief valve 24 may be provided, which may regulate pressurization.

The measurement device 22 may measure continuously the oxygen content, the temperature and the pressure. The corresponding information is conveyed to the regulating or control unit 23.

The development of smoke may be detected also visually, for example (with the aid of a video camera). The captured images then are electronically evaluated and may, if necessary, be transmitted to the cockpit, so that the pilot can form an image of the situation in the room 25.

In addition, a climate control assembly may be provided, which draws air from the room 25, warms or cools it, and supplies it again to the room. In this manner, for example, with heating in the room, no air must be supplied externally to the room. In this manner, the oxygen content may remain constant and the temperature may be controlled. In addition, the climate control assembly may also be used for temperature regulation of the supply line 16.

The regulating or control unit 23 regulates and/or controls in particular, e.g., the air supply 9 for adjusting the oxygen content in the exhaust, the fuel supply 5, the supply 2 of the nitrogen-enriched cathode exhaust air and all valves, heat exchangers, compressors, climate control assemblies, and blowers installed in the fire fighting system 100.

The control and regulating system may be controlled via a line 29. The supply line 16 from the room 25 may be regulated via a valve 30.

In addition, the electrical and thermal energy required in the system, such a for example for the compressors, the heat exchanger, or the climate control assembly, may be provided either from the fuel cell 1, from external sources (not shown in FIG. 3) or from a combination of both.

Figure 6:
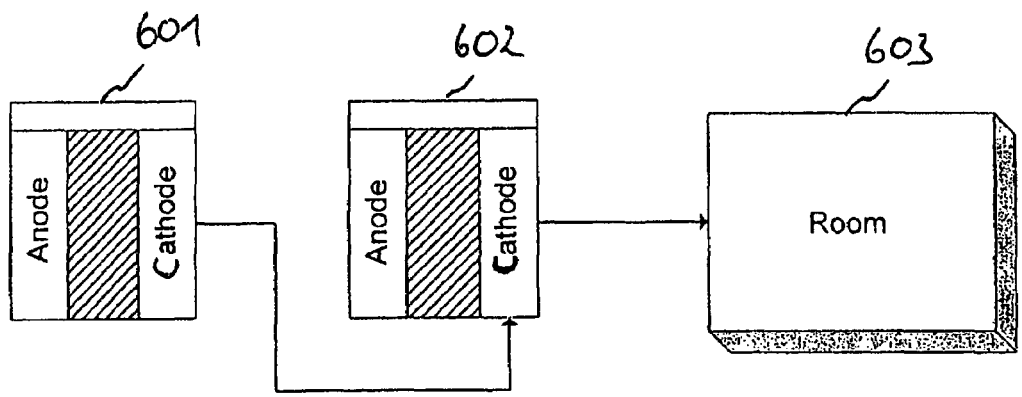
FIG. 6 shows a schematic principle diagram of a fire fighting system according to an exemplary embodiment of the present invention.

FIG. 6 shows schematically a series connection of fuel cells 601, 602. The cathode exhaust air of a fuel cell 601 may serve here as air supply of another fuel cell 602. In this manner, the oxygen content of the cathode exhaust air of the second fuel cell 602 may be lowered further. This technical arrangement may be possible only up to a certain degree, since fuel cells require a certain oxygen portion in the cathode supply, in order not to "smother" from too little oxygen.

The supply line of one fuel cell to another, as well as the supply line of the last fuel cell 602 into the room 603 may comprise an arrangement of measuring devices, compressors, and heat exchangers, as shown in FIG. 3.

Figure 7:
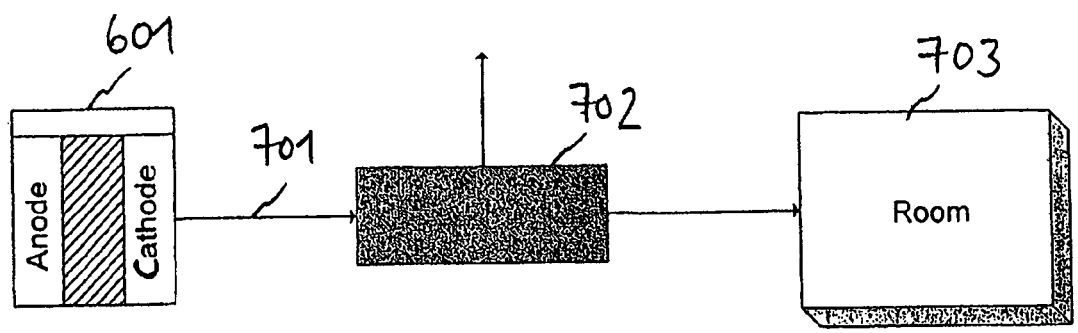
FIG. 7 shows a schematic principle diagram of a fire fighting system according to an exemplary embodiment of the present invention.

FIG. 7 shows a further embodiment. Here, the cathode exhaust air 701 is connected to a further device for oxygen reduction 702, such as for example, an air fractionation membrane. In this manner, the oxygen content of the cathode exhaust air is lowed further before supply into the room 703. Air fractionation membranes divide air into an oxygen-enriched and a nitrogen-enriched air flow. The oxygen-enriched portion is released into the environment and the nitrogen-enriched portion is conducted into the room.

Figure 8:
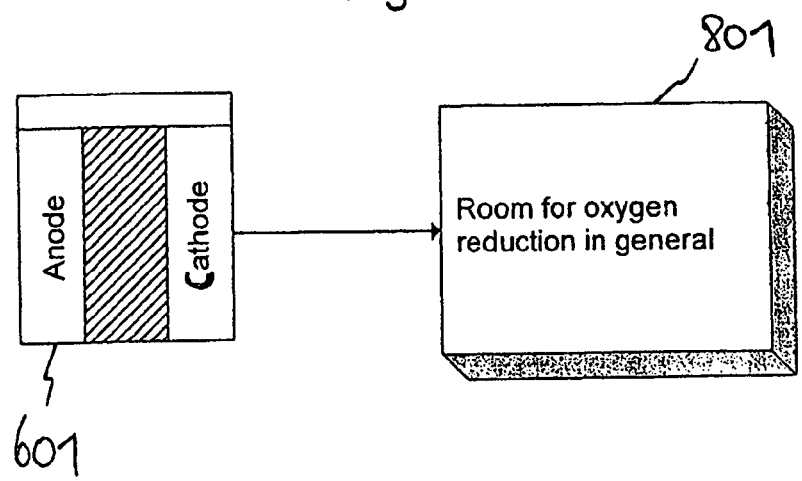
FIG. 8 shows a schematic principle diagram of a fire fighting system according to an exemplary embodiment of the present invention.

The principles of oxygen reduction generally with fuel cells 601 is shown in FIG. 8. The advantages of oxygen reduction, which is provided for fire fighting, the storage of goods, altitude training, and many other applications, can be supplemented by fuel cells in the following areas. Fuel cells operate silently, with low emissions, and very efficiently in the production of current and heat. In combination with all applications of the oxygen reduction, the fuel cell advances to an energy and security system. Current and heat can be used or supplied locally. The exhaust gas reduces the oxygen content in rooms 801. The rooms 801 are protected from fires and the oxidation behavior of stored goods is reduced. A further advantage is provided by the operating temperature of the fuel cell, which amounts to at least 70° C., so that the exhaust gas can be considered as almost germ-free/sterile.

The fuel cell may offer energy supply and fire fighting in one system.

Figure 9:
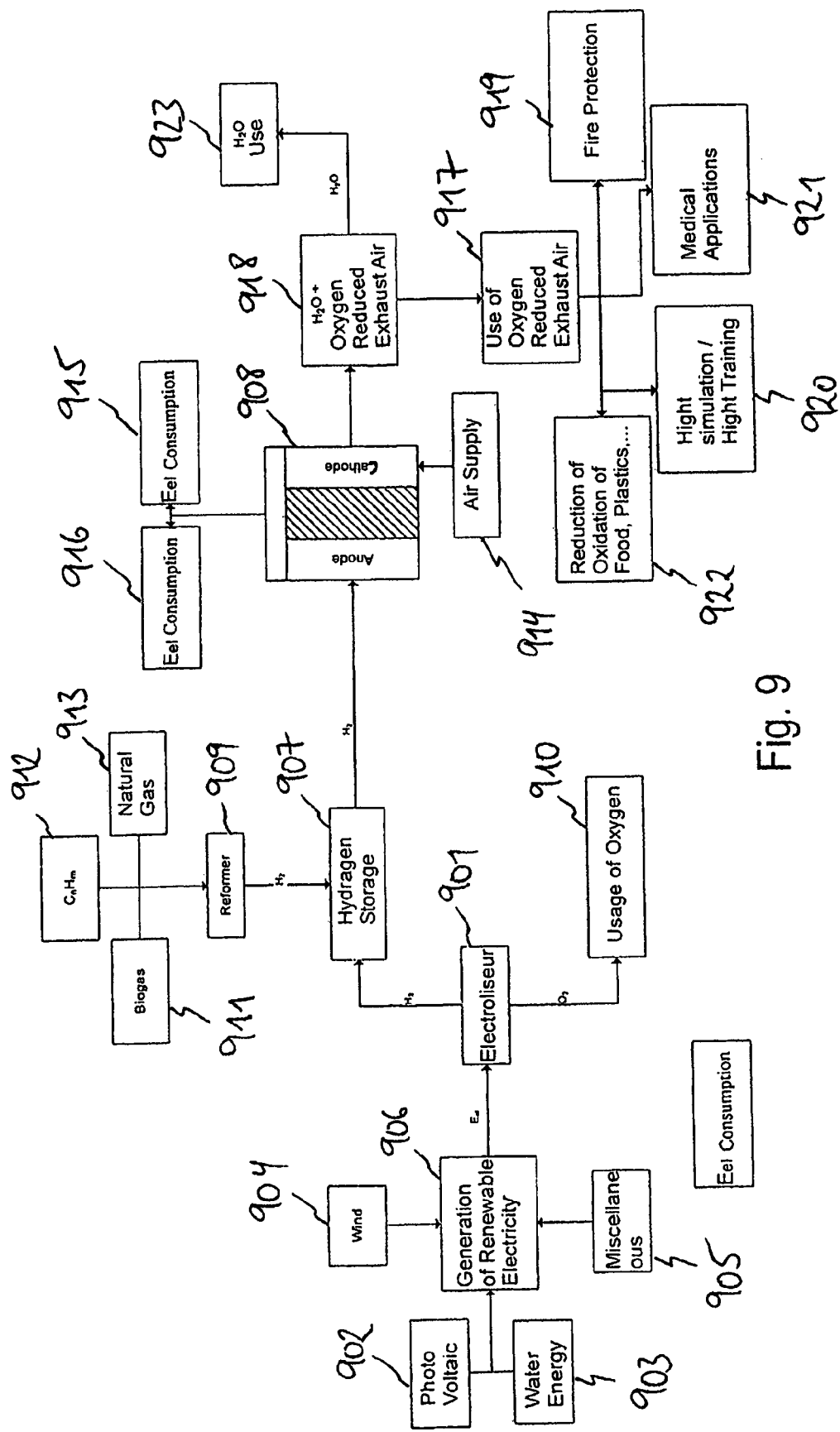
FIG. 9 shows a schematic principle diagram of a fire fighting system according to an exemplary embodiment of the present invention.

A schematic principle diagram of a self-sufficient energy and security system with the additional applications in athletic, medical, and logistic areas is shown in FIG. 9. Current is produced in a renewably manner in different ways and supplied in an electrolyzer 901. The production of the current takes place, for example, via photovoltaics 902, water power 903, wind power 904, or in another manner 905. A corresponding generator 906 (for example, a hydroelectric plant or a wind turbine) conducts the current from the electrolyzer 901. The electrolyzer generates hydrogen and oxygen from water. Oxygen may be used, for example in industrial applications or released to the environment. The produced hydrogen may be stored in a storage 907 or may be supplied directly to the fuel cell 908. Alternatively to the electrolyzer, the hydrogen may be produced by a reformer 909, which is provided via a bio-gas storage 911, hydrocarbon storage 912, or natural gas storage 913. The oxygen may be stored in a storage 910.

In addition to hydrogen, the fuel cell requires air, which is supplied via the supply 914. The product energy in a thermal and electric form can be supplied to a thermal consumer 915 or an electrical consumer 916 or supplied in a network. Likewise, the produced water 923 may be used. The application possibilities of the oxygen-poor air 917 are numerous, such as for example, the use for fire protection 919, for altitude simulation 920, and for medical purposes 921 or for oxidation reduction for storing of food or plastics.

The oxygen-poor air is separated from produced water in the separating device 918.

The invention is not limited in its design to the preferred embodiments shown in the figures. In addition, a plurality of variations is contemplated, which make use of the shown solution and the inventive principle also with essentially other different embodiments.

In addition, it is noted that "including" does not exclude other elements or steps and "a" or "one" does not exclude a plurality. Furthermore, it is noted that features or steps, which are described with reference to one of the above embodiments, also can be used in combination with other features or steps of other embodiments described above. Reference numerals in the claims are not to be viewed as limitations.

The invention claimed is:

1. A fire fighting system for extinguishing a fire source in a room, the fire fighting system comprising:
   a fuel cell for producing a nitrogen-enriched cathode exhaust air, the fuel cell having a cathode and an anode; and
   a conduit assembly for supplying the nitrogen-enriched cathode exhaust air to the fire source to reduce an oxygen content around the fire source, such that the fire source is extinguished,
   an air supply of the fuel cell supplying external air from outside the room to the cathode of the fuel cell;
   a conduit measurement unit measuring at least one of the oxygen content and the hydrogen content of the exhaust air in the conduit assembly;
   wherein the system is configured to adjust a lambda value of the cathode by regulating an air supply of the fuel cell based at least on the output of the conduit measurement unit, thereby controlling the oxygen content of the room;
   wherein the lambda value represents the ratio between the oxygen amount supplied to the fuel cell and the oxygen amount converted inside the fuel cell; and
   wherein the cathode exhaust air has a lower oxygen content and a higher nitrogen content than the air supply from outside the room to the cathode of the fuel cell.

2. The fire fighting system of claim 1, further comprising:
   a regulating unit for triggering the supply of the nitrogen-enriched cathode exhaust air to the fire source.

3. The fire fighting system of claim 2,
   wherein the regulating unit regulates at least one of an air supply to the cathode of the fuel cell, a fuel supply to the anode of the fuel cell, and the supply of the nitrogen-enriched cathode exhaust air to the fire source.

4. The fire fighting system of claim 2, further comprising:
   a first measurement unit for measuring at least one physical parameter selected from the group consisting of oxygen content within the room, a hydrogen content within the room, a temperature within the room, a pressure within the room, and development of smoke within the room; and
   a first data line for transmitting the measured physical parameters from the first measurement unit to the regulating unit.

5. The fire fighting system of claim 4, further comprising:
   a second measurement unit for measuring a physical parameter, selected from the group consisting of the oxygen content of the exhaust air in the conduit assembly, the hydrogen content of the exhaust air in the conduit assembly, the carbon dioxide content of the exhaust air in the conduit assembly, the carbon monoxide content of the exhaust air in the conduit assembly, the nitrogen oxide content of the exhaust air in the conduit assembly, the volume flow of the exhaust air in the conduit assembly, the temperature of the exhaust air in the conduit assembly, the pressure of the exhaust air in the conduit assembly, and the moisture content of the exhaust air in the conduit assembly.

6. The fire fighting system of claim 5, further comprising:
   a second data line for transmitting the measured physical parameters from the second measurement unit to the regulating unit.

7. The fire fighting system of claim 1, further comprising:
   a pressure relief valve for regulating a pressurization in the room.

8. The fire fighting system of claim 1, further comprising at least one of:
   a compressor for compressing the nitrogen-enriched cathode exhaust air, so that the fire extinguishing power is increased; and
   a heat exchanger for cooling the nitrogen-enriched cathode exhaust air.

9. The fire fighting system of claim 1, further comprising:
   a condenser for condensing water out of the nitrogen-enriched cathode exhaust air; and
   a water tank for storing the condensed water.

10. The fire fighting system of claim 1, further comprising:
    a supply line for providing an air supply of the cathode of the fuel cell from the room, whereby the oxygen content in the room can be lowered further.

11. The fire fighting system of claim 1, further comprising:
    a climate control assembly for temperature regulation of the room.

12. The fire fighting system of claim 2,
    wherein the regulating unit further regulates at least one of a heat exchanger, for cooling the nitrogen-enriched cathode exhaust air, a compressor for compressing the nitrogen-enriched cathode exhaust air so that the fire extinguishing power is increased, a pressure relief valve for regulating a pressurization in the room, a climate control assembly for temperature regulation of the room, a bleed valve, and a supply of the water.

13. The fire fighting system of claim 1,
    wherein an electrical energy and a thermal energy required in the fire fighting system are provided directly from the fuel cell.

14. The fire fighting system of claim 1, further comprising:
    an extinguishing system.

15. The fire fighting system of claim 1, wherein the room is a room in an aircraft.

16. An aircraft comprising a fire fighting system for fire fighting in a room of the aircraft, the system comprising:
    a fuel cell for producing a nitrogen enriched cathode exhaust air, the fuel cell having a cathode and an anode; and
    a conduit assembly for supplying the nitrogen-enriched cathode exhaust air to the fire source to reduce an oxygen content around the fire source, such that the fire source is extinguished,
    an air supply of the fuel cell supplying external air from outside the room to the cathode of the fuel cell;

a conduit measurement unit measuring at least one of the oxygen content and the hydrogen content of the exhaust air in the conduit assembly;

wherein the system is configured to adjust a lambda value of the cathode by regulating an air supply of the fuel cell based at least on the output of the conduit measurement unit, thereby controlling the oxygen content of the room;

wherein the lambda value represents the ratio between the oxygen amount supplied to the fuel cell and the oxygen amount converted inside the fuel cell; and wherein the cathode exhaust air has a lower oxygen content and a higher nitrogen content than the air supply from outside the room to the cathode of the fuel cell.

17. A method for fire fighting in a room, comprising:

supplying external air from outside the room to the cathode of the fuel cell;

producing a nitrogen-enriched cathode exhaust air with a fuel cell having a cathode and an anode;

measuring at least one of the oxygen content and the hydrogen content of the exhaust air in the conduit assembly; and supplying the nitrogen-enriched cathode exhaust air to a fire source, so that an oxygen content around the fire source is reduced, such that the fire source is extinguished, wherein a lamba value of the cathode is adjusted by regulating an air supply of the fuel cell based at least on the output of a conduit measurement unit, thereby controlling the oxygen content of the room;

wherein the lambda value represents the ratio between the oxygen amount supplied to the fuel cell and the oxygen amount converted inside the fuel cell; and wherein the cathode exhaust air has lower oxygen content and a higher nitrogen than the air supply from outside the room to the cathode of the fuel cell.

18. The method of claim 17, further comprising:

triggering the supply of the nitrogen-enriched cathode exhaust air to the fire source.

19. The method of claim 18, further comprising:

measuring at least one physical parameter selected from the group consisting of an oxygen content within the room, a hydrogen content within the room, a temperature within the room, a moisture content within the room, a pressure within the room, and a detection of a fire characteristic within the room; and transmitting the measured physical parameters from the measurement unit to a regulating or control unit for triggering the supply of the nitrogen-enriched cathode exhaust air to the fire source.

* * * * *